United States Patent
Son et al.

(10) Patent No.: US 11,206,703 B2
(45) Date of Patent: Dec. 21, 2021

(54) METHOD AND TERMINAL FOR PROVIDING VEHICLE COMMUNICATION SERVICES

(71) Applicant: Samsung Electronics Co., Ltd., Suwon-si (KR)

(72) Inventors: Jungje Son, Suwon-si (KR); Sunghoon Kim, Suwon-si (KR); Jungshin Park, Suwon-si (KR); Hoyeon Lee, Suwon-si (KR); Youngkyo Baek, Suwon-si (KR); Yoonseon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/716,226

(22) Filed: Dec. 16, 2019

(65) Prior Publication Data

US 2020/0196363 A1    Jun. 18, 2020

(30) Foreign Application Priority Data

Dec. 17, 2018 (KR) .......................... 10-2018-0163313

(51) Int. Cl.
*H04W 76/14* (2018.01)
*H04W 4/06* (2009.01)
(Continued)

(52) U.S. Cl.
CPC .......... *H04W 76/14* (2018.02); *H04W 4/023* (2013.01); *H04W 4/06* (2013.01); *H04W 4/38* (2018.02); *H04W 4/44* (2018.02); *H04W 4/46* (2018.02)

(58) Field of Classification Search
CPC ....... H04W 76/14; H04W 4/023; H04W 4/06; H04W 4/38; H04W 4/44; H04W 4/46; H04W 4/40; H04W 4/70; H04W 24/02; H04W 56/0015; H04W 56/002; H04W 84/00; H04W 76/40; G08G 1/0133;
(Continued)

(56) References Cited

U.S. PATENT DOCUMENTS 9,805,601 B1 * 10/2017 Fields .............. G08G 1/096725
10,504,302 B1 * 12/2019 Chavez ................... H04W 4/90
(Continued)

FOREIGN PATENT DOCUMENTS

EP           3349514 A1      7/2018
KR    10-2017-0139042 A    12/2017
(Continued)

OTHER PUBLICATIONS

International Search Report and Written Opinion of the International Searching Authority in connection with International Application No. PCT/KR2019/017468 dated Mar. 25, 2020, 11 pages.
(Continued)

*Primary Examiner* — Diane D Mizrahi

(57) ABSTRACT

A terminal operation method for providing vehicle communication services. The operation method includes obtaining broadcast information broadcast by a plurality of external terminals, identifying locations of the plurality of external terminals with respect to the terminal, based on the obtained broadcast information, and selecting at least one terminal of the plurality of external terminals as a unicast target terminal, based on the identified locations.

20 Claims, 14 Drawing Sheets

(51) Int. Cl.
*H04W 4/44* (2018.01)
*H04W 4/46* (2018.01)
*H04W 4/38* (2018.01)
*H04W 4/02* (2018.01)

(58) Field of Classification Search
CPC .......... G08G 1/0141; G08G 1/096725; G08G 1/0112; G08G 1/096741; G08G 1/096783; G08G 1/096791; G08G 1/017; G08G 1/0175; G08G 1/161; G08G 1/162; G01S 5/0072; G01S 5/0284
See application file for complete search history.

(56) References Cited

U.S. PATENT DOCUMENTS

| | | |
|---|---|---|
| 2005/0030202 A1* | 2/2005 | Tsuboi ............. G08G 1/096758 340/901 |
| 2011/0134840 A1* | 6/2011 | Kim ...................... H04W 40/20 370/328 |
| 2016/0275790 A1 | 9/2016 | Kang et al. |
| 2018/0018877 A1 | 1/2018 | Townsend |
| 2018/0077633 A1 | 3/2018 | Chae et al. |
| 2018/0084369 A1* | 3/2018 | Hou ........................ H04W 4/00 |
| 2018/0206073 A1* | 7/2018 | Wang ................... H04L 5/0053 |
| 2018/0224846 A1* | 8/2018 | Kovacs ................ G08G 1/0141 |
| 2019/0045469 A1 | 2/2019 | Zhang et al. |

FOREIGN PATENT DOCUMENTS

| | | |
|---|---|---|
| KR | 10-2018-0044992 A | 5/2018 |
| KR | 10-2018-0102110 A | 9/2018 |
| WO | 2017166260 A1 | 10/2017 |

OTHER PUBLICATIONS

ETSI TS 102 940 v1.3.1 (Apr. 2018), "Intelligent Transport Systems (ITS); Security; ITS communications security architecture and security management," Technical Specification, Apr. 2018, 42 pages.
Intel Corporation, "Traffic Models and Performance Metrics for V2X Evaluations," R1-153994, 3GPP TSG RAN WG1 Meeting #82, Beijing, China, Aug. 24-28, 2015, 4 pages.
"CAR 2 CAR Communication Consortium Manifesto, Overview of the C2C-CC System", Aug. 28, 2007, 94 pages.
Nokia et al., "Initial View on Support of unicast, groupcast and broadcast", 3GPP TSG RAN WG1 Meeting #94, Aug. 20-24, 2018, R1-1809044, 5 pages.
Supplementary European Search Report dated Sep. 1, 2021 in connection with European Patent Application No. 19 90 1110, 13 pages.

* cited by examiner

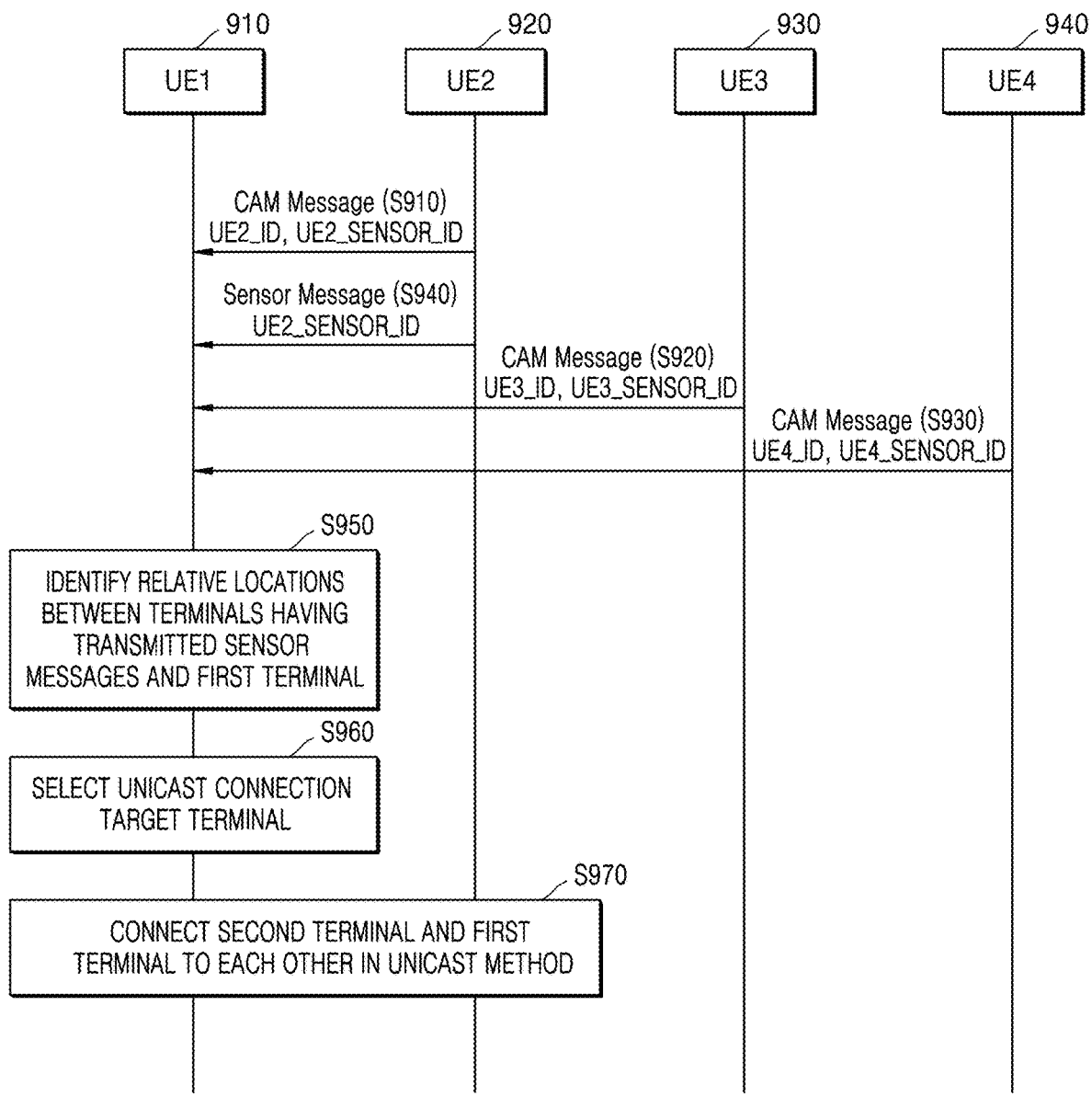

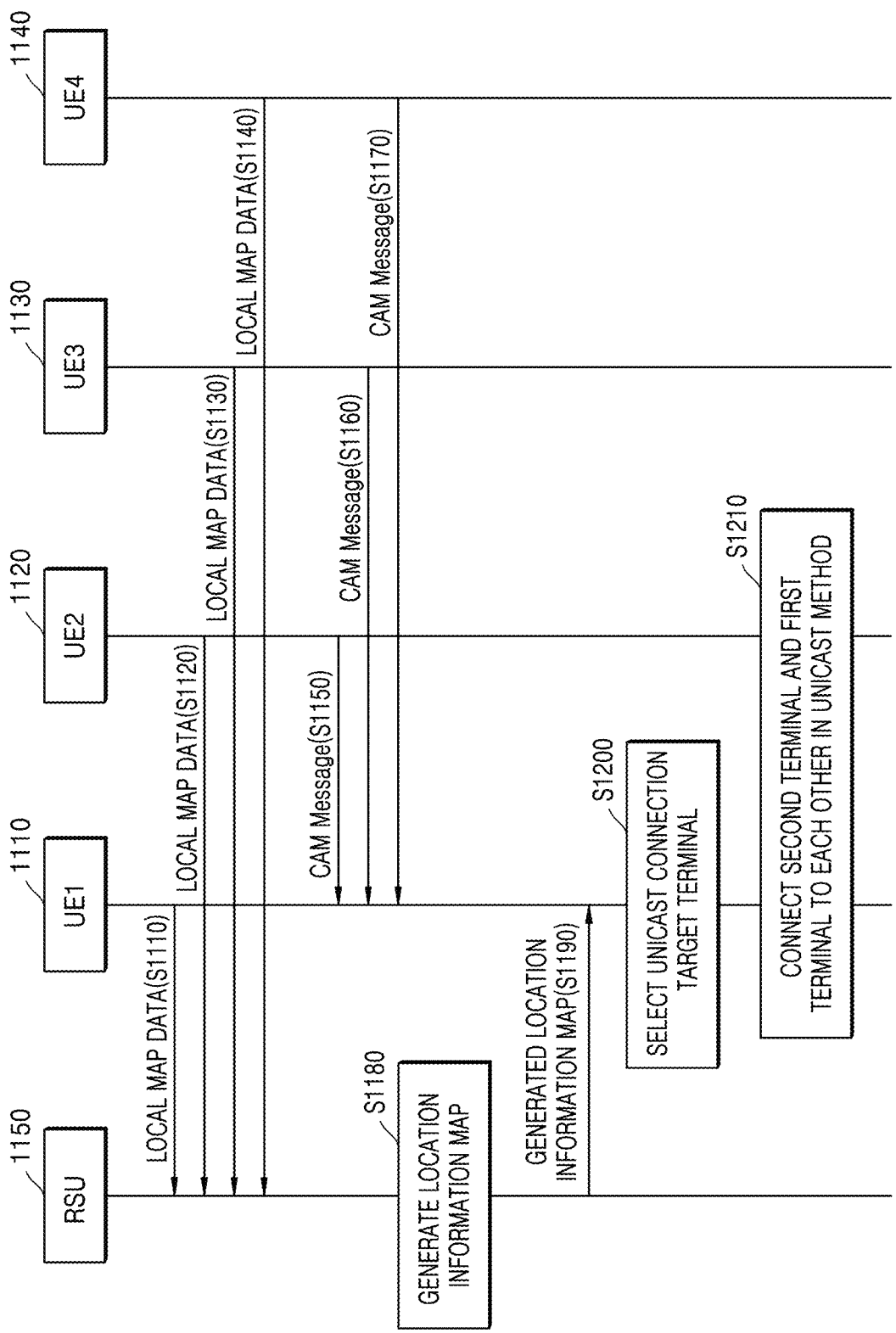

METHOD AND TERMINAL FOR PROVIDING VEHICLE COMMUNICATION SERVICES

CROSS-REFERENCE TO RELATED APPLICATION

This application is based on and claims priority under 35 U.S.C. § 119 to Korean Patent Application No. 10-2018-0163313 filed on Dec. 17, 2018 in the Korean Intellectual Property Office, the disclosure of which is incorporated by reference herein in its entirety.

BACKGROUND

1. Field

The disclosure relates to a method and terminal for providing vehicle communication services. More particularly, the disclosure relates to a method and terminal for selecting a target device for providing vehicle communication services.

2. Description of the Related Art

In order to meet the increasing demand with respect to wireless data traffic after the commercialization of 4G communication systems, efforts have been made to develop improved 5G communication systems or pre-5G communication systems. For this reason, 5G communication systems or pre-5G communication systems are called Beyond 4G network communication systems or Post LTE systems. 5G communication systems standardized by the 3rd Generation Partnership Project (3GPP) are called new radio (NR) systems. In order to achieve a high data transmission rate, consideration is given to implementing 5G communication systems in millimeter wave (mmW) frequency bands (e.g., 60 GHz bands). In order to reduce path loss and increase a transmission distance in the millimeter wave frequency bands, in 5G communication systems, discussions are underway about technologies such as beam-forming, massive multiple input multiple output (MIMO), full dimensional MIMO (FD-MIMO), array antenna, analog beam-forming, and large scale antenna. Also, in order to improve networks of systems, in 5G communication systems, developments in technologies such as evolved small cell, advanced small cell, cloud radio access network (cloud RAN), ultra-dense network, device to device communication (D2D), wireless backhaul, moving network, cooperative communication, coordinated multi-points (CoMP), and interference cancellation are underway. Furthermore, in 5G communication systems, developments in an advanced coding modulation (ACM) scheme such as hybrid FSK and QAM modulation (FQAM) and sliding window superposition coding (SWSC) and an enhanced network access scheme such as filter bank multi carrier (FBMC), non-orthogonal multiple access (NOMA), or sparse code multiple access (SCMA) are underway.

The Internet is being developed from a human-centered network via which people generate and consume information to an Internet of Things (IoT) network via which distributed components, such as things, transmit or receive information to or from each other and process the information. Internet of Everything (IoE) technology in which big data processing technology is combined with IoT technology via connection with a cloud server or the like, is emerging. To implement IoT, technical elements, such as sensing technology, a wired/wireless communication and network infrastructure, service interface technology, and security technology, are required, and thus, a sensor network, machine to machine (M2M) communication, machine type communication (MTC), and the like for connection between things have recently been studied. In IoT environments, an intelligent Internet Technology (IT) service for collecting and analyzing data generated by connected things and creating new value in people's lives may be provided. IoT is applicable to various fields, such as smart home, smart building, smart city, smart car or connected car, smart grid, health care, smart home appliances, and advanced medical care, via convergence and combination of existing information technology (IT) with various industries.

Accordingly, various attempts are being made to apply 5G communication systems to IoT networks. For example, 5G communication such as a sensor network, M2M communication, or MTC is implemented by technology such as beam-forming, MIMO, or array antenna. The application of a cloud RAN as big data processing technology may also be considered as an example of convergence of 5G technology and IoT technology.

Because mobile communication systems may provide various services due to the developments in the above mobile communication systems, methods of effectively providing the services are required.

SUMMARY

Provided are a method and terminal capable of effectively providing vehicle communication services.

Additional aspects will be set forth in part in the description which follows and, in part, will be apparent from the description, or may be learned by practice of the presented embodiments of the disclosure.

According to an embodiment of the disclosure, an operation method of a terminal that provides vehicle communication services includes
obtaining broadcast information broadcast by a plurality of external terminals, identifying locations of the plurality of external terminals with respect to the terminal, based on the obtained broadcast information, and selecting at least one of the plurality of external terminals as a unicast target terminal, based on the identified locations.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9 illustrates a flowchart of a method of selecting a unicast target terminal, according to an embodiment of the disclosure;

FIG. 11 illustrates a flowchart of a method of selecting a unicast target terminal, according to an embodiment of the disclosure;

DETAILED DESCRIPTION

Figure 1:
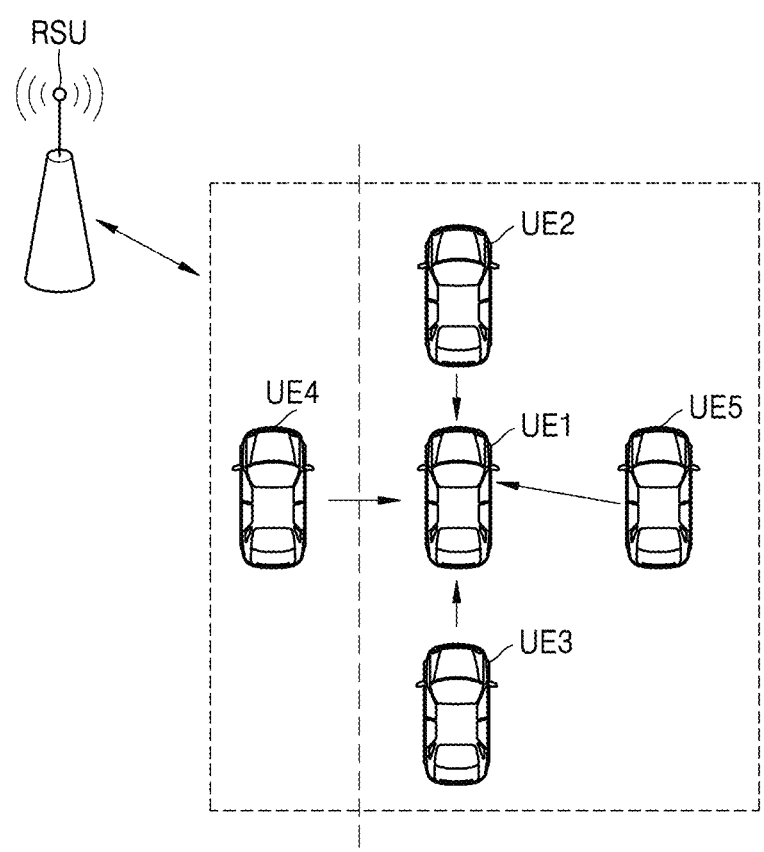
FIG. 1 illustrates a schematic view for explaining a vehicle communication service providing method according to an embodiment of the disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Reference will now be made in detail to embodiments, examples of which are illustrated in the accompanying drawings. A method of constructing and using an electronic device, according to an embodiment of the disclosure, will now also be described with reference to the accompanying drawings. Like reference numerals or characters in the drawings denote like parts or components.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, and a multimedia system capable of performing a communication function.

In the disclosure, a controller may also be referred to as a processor.

In the disclosure, a layer may also be referred to as an entity.

While such terms as "first", "second", etc., may be used to describe various components, such components must not be limited to the above terms. The terms first and second should not be used to attach any order of importance but are used to distinguish one element from another element. For example, a first component discussed below could be termed a second component, and similarly, a second component may be termed a first component without departing from the teachings of the disclosure. The term "and/or" includes any and all combinations of one or more of the associated listed items.

The terms used in the present specification are merely used to describe particular embodiments of the disclosure, and are not intended to limit the disclosure. An expression used in the singular encompasses the expression of the plural, unless it has a clearly different meaning in the context. In the present specification, it is to be understood that the terms such as "including", "having", and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The term "unit" or "-er(or)" used herein denotes a software element or a hardware element such as a field-programmable gate array (FPGA) or an application-specific integrated circuit (ASIC), and performs a certain function. However, the term "unit" or "-er(or)" is not limited to software or hardware. The term "unit" or "-er(or)" may be configured to be included in an addressable storage medium or to reproduce one or more processors. Thus, the term "unit" or "-er(or)" may include, by way of example, object-oriented software components, class components, and task components, and processes, functions, attributes, procedures, subroutines, segments of a program code, drivers, firmware, a micro code, a circuit, data, a database, data structures, tables, arrays, and variables. Functions provided by components and "units" or "-ers(ors)" may be combined into a smaller number of components and "units" or "-ers (ors)" or may be further separated into additional components and "units" or "-ers(ors)". In addition, the components and "units" or "-ers(ors)" may be implemented to operate one or more central processing units (CPUs) in a device or a secure multimedia card. According to an embodiment of the disclosure, the "unit" or "-er(or)" may include one or more processors.

As used in the following description, terms identifying access nodes, terms indicating network entities, terms indicating messages, terms indicating interfaces between network entities, terms indicating various types of identification information, etc. are exemplified for convenience of explanation. Accordingly, the disclosure is not limited to terms to be described later, and other terms representing objects having the equivalent technical meaning may be used.

Hereinafter, for convenience of description, the disclosure uses terms and names defined in the 3rd Generation Partnership Project Long Term Evolution (3GPP LTE) standard. However, the disclosure is not limited to the terms and names but may also be identically applied to systems that comply with other standards.

In particular, the disclosure may be applied to the 3GPP New Radio (NR) (5th mobile communications standard). The disclosure are applicable to intelligent services based on the 5G communication technology and the Internet of Things (IoT) related technology (e.g., smart home, smart building, smart city, smart car or connected car, health care, digital education, retail business, and security- and safety-related service). Furthermore, the term "terminal" may refer to a mobile phone, NB-IoT devices, sensors, and other wireless communication devices.

Although embodiments of the disclosure are hereinafter described with respect to an LTE, LTE-Advanced (LTE-A), LTE Pro, or 5G (or NR as next-generation mobile communication) system, the embodiments of the disclosure may be applied to other communication systems having similar technical backgrounds and channel configurations. Furthermore, it should be understood by those skilled in the art that the embodiments of the disclosure are applicable to other communication systems though modifications not departing from the scope of the disclosure.

Vehicle-to-everything (V2X) is a general term referring to all types of communication schemes applicable to vehicles on the road, and enable various supplementary services in addition to initial safety-related use cases in line with advancement in wireless communication technologies.

A wireless access in vehicular environments (hereinafter, referred to as "WAVE") standard based on Institute of Electrical and Electronics Engineers (IEEE) 802.11p and IEEE P1609 has been standardized as a technology for providing V2X services. However, a WAVE technology that is a type of dedicated short range communication (DSRC) technology has a limitation in terms of a message delivery distance between vehicles.

To overcome the limitation, discussions on a cellular based V2X standard are ongoing at 3GPP. A LTE-based 4G V2X standard has been completed in Release 14, and discussions on a 5G V2X standard based on NR (hereinafter, referred to as "NR" or "5G") are ongoing in Release 16.

FIG. 1 illustrates a schematic view for explaining a vehicle communication service providing method according to an embodiment of the disclosure.

Referring to FIG. 1, a plurality of terminals UE1 through UE5 may be located on a road. According to an embodiment of the disclosure, the plurality of terminals UE1 through UE5 may be vehicle terminals. A vehicle terminal may represent a terminal related to a vehicle, and may be a terminal that provides vehicle communication services. In the present specification, a terminal will be interchangeably used with a vehicle, but it will be sufficiently understood by one of ordinary skill in the art that a terminal may refer to a vehicle terminal in which a terminal is located on or inserted into a vehicle. As shown in FIG. 1, the plurality of terminals UE1 through UE5 may run on a road.

The terminal UE1 may be connected to a plurality of external terminals UE2 through UE5 and may receive or provide communication services. The terminal UE1 may receive or provide a broadcast service from or to the plurality of external terminals UE2 through UE5, and may receive or provide a unicast- or group/multicast service from or to the plurality of external terminals UE2 through UE5.

FIG. 1 illustrates a scenario in which the terminal UE1 receives communication services from the plurality of external terminals UE2 through UE5 by a broadcast method. However, it will be sufficiently understood by one of ordinary skill in the art that embodiments of the disclosure are applicable to terminals that provide or receive communication services in various other methods.

Referring to FIG. 1, the terminal UE1 may receive broadcast information from each of the plurality of external terminals UE2 through UE5. According to an embodiment of the disclosure, the broadcast information may include a cooperative awareness message (CAM). The CAM may be a broadcast beacon that is used to maintain recognition of a peripheral terminal, and may be periodically generated. According to an embodiment of the disclosure, the CAM may include dynamic state information (such as, a direction and a speed) of a vehicle, vehicle static data (such as, a dimension), and basic vehicle information (such as, an external illumination state and a path history). The CAM may have a size of 50 to 300 bytes and may be transmitted at an adaptive frequency of 1 to 10 Hz, but the technical spirit of the disclosure is not limited thereto.

When the terminal UE1 faces a certain event associated with the UE 1 (or, associated with vehicle driving), the terminal UE1 may transmit or receive communication services to or from at least one terminal associated with the certain event from among the plurality of external terminals UE2 through UE5, using a unicast method. For example, when the speeds of vehicles decrease, the terminal UE1 may form a unicast connection with the terminal UE3 located behind the terminal UE1 and accordingly transmit or receive information about speed control to or from the terminal UE3. Alternatively, when a vehicle wants to change its lane to a right lane, the terminal UE1 may form a unicast connection with the terminal UE5 located on the right side of the terminal UE1 and transmit or receive information about a lane change to or from the terminal UE5.

According to an embodiment of the disclosure, an identifier (ID) of a transceiving terminal may be needed to form a unicast connection. In other words, the terminal UE1 may need to obtain the ID of the terminal UE2 to form a unicast connection with the terminal UE2.

The plurality of external terminals UE2 through UE5 may transmit information including their own IDs, as broadcasting information, in a broadcast method. According to an embodiment of the disclosure, the ID of each terminal may be included in the CAM included in the broadcast information. However, the technical spirit of the disclosure is not limited thereto.

The terminal UE1 may obtain the IDs of the plurality of external terminals UE2 through UE5 from pieces of broadcast information respectively received from the plurality of external terminals UE2 through UE5. The terminal UE1 may select at least one terminal associated with the certain event from among the plurality of external terminals UE2 through UE5, and may form a unicast connection with the selected terminal, based on the obtained ID of the selected terminal.

According to an embodiment of the disclosure, the terminal UE1 may identify the locations of the plurality of external terminals UE2 through UE5. The locations of the plurality of external terminals UE2 through UE5 may refer to locations relative to the terminal UE1. For example, the terminal UE1 may identify a terminal located on its front side, rear side, or lateral side. The terminal UE1 may select at least one terminal associated with the certain event, based on the respective identified locations of the plurality of external terminals.

According to an embodiment of the disclosure, the terminal UE1 may identify the locations of the plurality of external terminals UE2 through UE5, based on location information included in the pieces of broadcast information respectively received from the plurality of external terminals UE2 through UE5. The terminal UE1 may obtain its own location information, and may identify relative locations of the plurality of external terminals UE2 through UE5 with respect to the terminal UE1, based on location information of the plurality of external terminals UE2 through UE5 and the obtained location information of the terminal UE1. For example, the location information may be transmitted by being included in the CAM.

According to an embodiment of the disclosure, the terminal UE1 may identify the locations of the plurality of external terminals UE2 through UE5, based on vehicle identification information included in the pieces of broadcast information respectively received from the plurality of external terminals UE2 through UE5. The vehicle identification information may be information used for identification of a vehicle related to the plurality of external terminals UE2 through UE5. For example, the vehicle identification information may include at least one of a license plate number, a vehicle model, a vehicle color, a vehicle size, or information about accessories attached to a vehicle. For example, the vehicle identification information may be transmitted by being included in the CAM.

The terminal UE1 may obtain peripheral information. The peripheral information may be associated with the surrounding environment of the terminal UE1, and may include information about vehicles around the terminal UE1. According to an embodiment of the disclosure, the terminal UE1 may obtain peripheral information by using front/rear/left and right cameras, a recognition sensor, and the like of a vehicle.

The terminal UE1 may identify relative locations of the plurality of external terminals UE2 through UE5 with respect to the terminal UE1, based on the received vehicle identification information and the obtained peripheral information. For example, when a license plate number included in the vehicle identification information received from the terminal UE2 is 1234 and a license plate number extracted from an image captured by the rear camera is 1234, the terminal UE1 may identify the terminal UE2 as a vehicle located behind the terminal UE1.

According to an embodiment of the disclosure, the terminal UE1 may identify the locations of the plurality of external terminals UE2 through UE5, based on sensor messages respectively received from the plurality of external terminals UE2 through UE5. Each of the sensor messages may be transmitted by a directional transceiver. The directional transceiver may transmit information only in a pre-identified specific direction, and may transmit a sensor message in a broadcast method.

According to an embodiment of the disclosure, the plurality of external terminals UE2 through UE5 or vehicles on which terminals are located may periodically transmit sensor messages including their IDs. The terminal UE1 may identify the locations of the plurality of external terminals UE2 through UE5, based on the IDs included in the sensor messages and the directions of the sensor messages. For example, when the ID included in a sensor message transmitted by a left-directional transceiver is the ID of the terminal UE5, the terminal UE1 may identify the terminal UE5 as a vehicle located on the right side.

According to another embodiment of the disclosure, the plurality of external terminals UE2 through UE5 or vehicles on which terminals are located may periodically transmit sensor messages including the IDs of sensors. At this time, the plurality of external terminals UE2 through UE5 may transmit broadcast information including the IDs of sensors. For example, the IDs of the sensors may be transmitted by being included in the CAMs. The terminal UE1 may identify the locations of the plurality of external terminals UE2 through UE5, based on the sensor IDs included in the sensor messages, the directions of the sensor messages, and the broadcast information. For example, when the sensor ID included in a sensor message transmitted by a left-directional transceiver is identical with the sensor ID included in the broadcast information of the terminal UE5, the terminal UE1 may identify the terminal UE5 as a vehicle located on the right side.

According to an embodiment of the disclosure, the terminal UE1 may identify the locations of the plurality of external terminals UE2 through UE5, based on a location information map received from a roadside unit (RSU). The location information map may include information about the locations of terminals located within a certain range.

For example, the terminal UE1 may identify the locations of the plurality of external terminals UE2 through UE5 by comparing the IDs of a plurality of external terminals included in the broadcast information with information about the IDs of terminals included in the location information map. However, the location information map according to the disclosure may have various formats and configurations.

According to an embodiment of the disclosure, the plurality of terminals UE1 through UE5 may transmit local map information to the RSU periodically or in response to a request from the RSU or a specific trigger. The local map information may be regarding the surrounding environment of each terminal including the location information of each terminal. The RSU may generate the location information map, based on pieces of local map information respectively received from the plurality of terminals UE1 through UE5. For example, the RSU may match the plurality of pieces of local map information, and may generate the location information map by correcting matched information.

When the terminal UE1 faces a certain event associated with the UE1 (or associated with vehicle driving), the terminal UE1 may select a plurality of terminals related to the certain event from among the plurality of external terminals UE2 through UE5, and may transmit or receive a communication service to or from the selected terminals in a groupcast method. Although an operation in which a terminal selects a unicast target terminal has been illustrated and described above, it will be sufficiently understood by one of ordinary skill in the art that the technical spirit of the disclosure is also applicable to an operation of selecting a groupcast target terminal.

Figure 2:
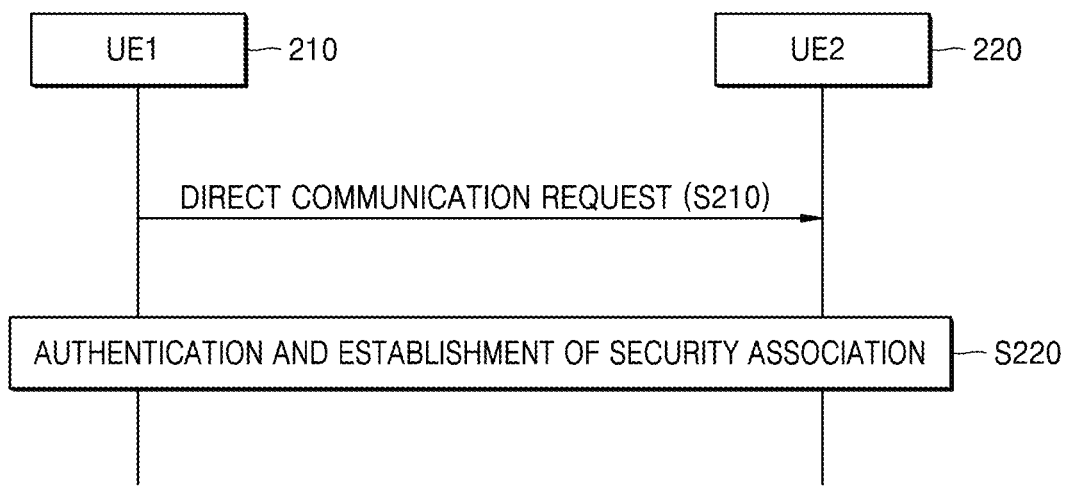
FIG. 2 illustrates a flowchart of a unicast connection method according to an embodiment of the disclosure.

FIG. 2 illustrates a flowchart of a unicast connection method according to an embodiment of the disclosure. Referring to FIG. 2, a first terminal 210 may transmit or receive a communication service by forming a unicast connection with a second terminal 220.

In operation S210, the first terminal 210 may transmit a direct communication request to the second terminal 220. According to an embodiment of the disclosure, the direct communication request may include the ID of the second terminal 220 and a security context.

In operation S220, the first terminal 210 and the second terminal 220 may establish authentication and security association and may transmit or receive a unicast communication service by using shared security information, for example, an encryption key.

Figure 3:
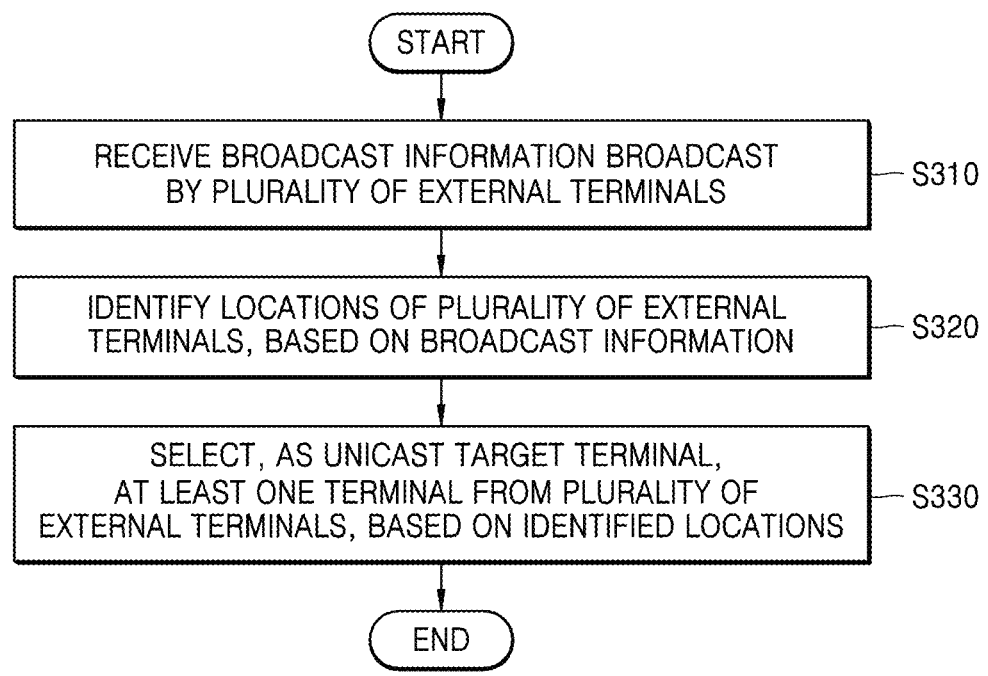
FIG. 3 illustrates a flowchart of a method of selecting a unicast target terminal, according to an embodiment of the disclosure.

FIG. 3 illustrates a flowchart of a method of selecting a unicast target terminal, according to an embodiment of the disclosure. Referring to FIG. 3, a terminal may select at least one external terminal from a plurality of external terminals, as a unicast target terminal.

In operation S310, the terminal may receive broadcast information broadcast by the plurality of external terminals. According to an embodiment of the disclosure, the broadcast information may include a CAM and also the ID of each of the plurality of external terminals. According to an embodiment of the disclosure, the IDs may be included in the CAM. However, the technical spirit of the disclosure is not limited thereto.

In operation S320, the terminal may identify the locations of the plurality of external terminals, based on the broadcast information. The locations of the plurality of external terminals may refer to locations relative to the terminal. For example, the terminal may identify a terminal located on its front side, rear side, or lateral side. Alternatively, the terminal may identify a plurality of terminals located on its one side, in order of their distance. Alternatively, the terminal may identify a terminal located on its opposite lane. However, the locations of the plurality of external terminals identified by the terminal are not limited thereto.

According to an embodiment of the disclosure, the terminal may identify the locations of the plurality of external terminals, based on location information included in the broadcast information. The terminal may obtain its own location information, and may identify relative location relationships between the plurality of external terminals and the terminal, based on location information of the plurality of external terminals and the obtained location information of the terminal.

According to an embodiment of the disclosure, the terminal may identify the locations of the plurality of external terminals, based on vehicle identification information included in the broadcast information and peripheral information about the surroundings of the terminal. The vehicle identification information may be related to the plurality of external terminals. For example, the vehicle identification information may include at least one of a license plate number, a vehicle model, a vehicle color, a vehicle size, or information about accessories attached to a vehicle. The peripheral information may be associated with the surrounding environment of the terminal, and may include information about vehicles around the terminal. According to an embodiment of the disclosure, the terminal may obtain peripheral information by using front/rear/left and right cameras, a recognition sensor, and the like of a vehicle. The terminal may identify relative locations of the plurality of external terminals with respect to the terminal, based on the received vehicle identification information and the obtained peripheral information.

According to an embodiment of the disclosure, the terminal may identify the locations of the plurality of external terminals, based on sensor messages received from the directional transceivers of the plurality of external terminals and the broadcast information. The terminal may identify the locations of the plurality of external terminals, based on the broadcast information and/or the IDs included in the sensor messages and the directions of the sensor messages.

According to an embodiment of the disclosure, the terminal may identify the locations of the plurality of external terminals, based on a location information map received from an RSU. The location information map may include information about the locations of terminals located within a certain range. For example, the terminal may identify the locations of the plurality of external terminals by comparing the IDs of the plurality of external terminals included in the broadcast information with information about the IDs of terminals included in the location information map.

In operation S330, the terminal may select, as a unicast target terminal, at least one terminal from the plurality of external terminals, based on the identified locations. According to an embodiment of the disclosure, when the terminal faces a certain event, the terminal may select at least one external terminal associated with the certain event as a unicast target terminal, based on the identified locations.

According to an embodiment of the disclosure, the terminal may recognize occurrence of the certain event. At this time, the terminal may identify a location associated with the recognized certain event. According to an embodiment of the disclosure, the terminal may obtain matching information about the location associated with the certain event, and identify the location associated with the certain event, based on the matching information. For example, an event of changing a current lane to a left lane may be associated with at least one location including a left vehicle location. Alternatively, an event of reducing a running speed may be associated with at least one location including a rear-side vehicle location. Alternatively, an event where an emergency situation has occurred may be associated with at least one location including a front-side vehicle. Occurrence of the certain event may be triggered based on a user input or based on external information obtained by the terminal. For example, the matching information may be stored in the terminal in the form of a profile, or may be received from an external source. Alternatively, the matching information may be trained by the terminal, or may be trained using a training apparatus located in the outside and transmitted to the terminal.

According to an embodiment of the disclosure, the terminal may select at least one location associated with the certain event, based on the matching information, and may select the unicast target terminal, based on the selected at least one location and the identified location. For example, when an event of changing a current lane to a left lane occurs, the terminal may select at least one location including a left vehicle location, for example, the left vehicle location and a left rear vehicle location, based on the matching information. Accordingly, the terminal may select vehicles identified as a left vehicle and a left rear vehicle, as unicast target terminals, based on the selected location.

Figure 4:
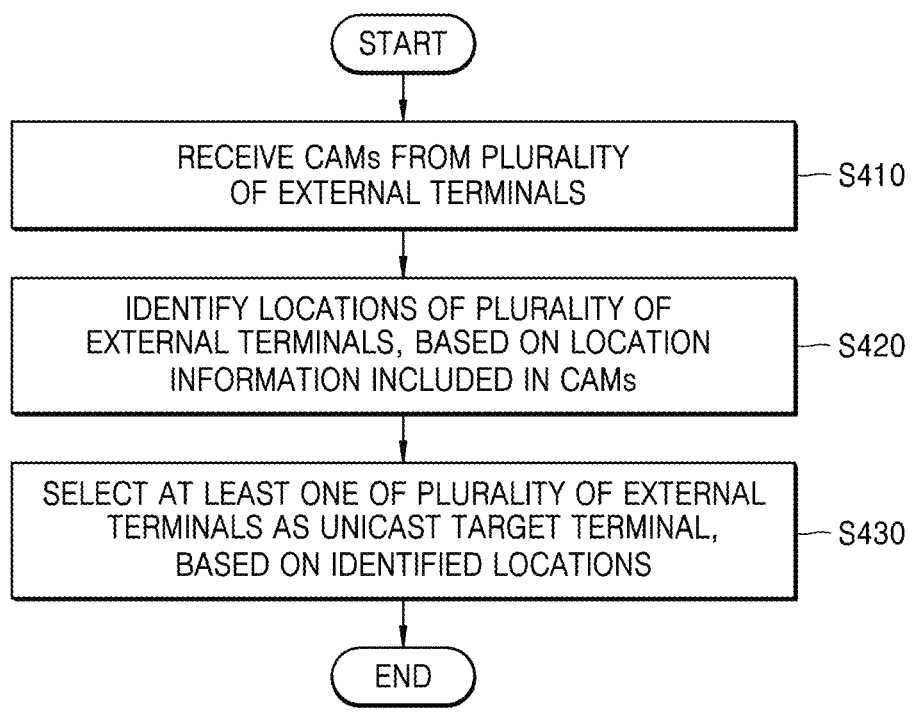
FIG. 4 illustrates a flowchart of a method of selecting a unicast target terminal, according to an embodiment of the disclosure.

FIG. 4 illustrates a flowchart of a method of selecting a unicast target terminal, according to an embodiment of the disclosure. Referring to FIG. 4, a terminal may select, as a unicast target terminal, at least one external terminal from a plurality of external terminals, based on location information included in CAMs.

In operation S410, the terminal may receive the CAMs from the plurality of external terminals. The plurality of external terminals may transmit the CAMs in a broadcast method. According to an embodiment of the disclosure, the CAMs may include the respective IDs of the plurality of external terminals. For example, each CAM may include at least one piece of information from among location information, running information obtained using an electronic control unit (ECU), a brake state, a running direction, a running speed, and acceleration.

According to an embodiment of the disclosure, the CAMs may be periodically broadcast by the plurality of external terminals, respectively. A cycle in which the CAMs are broadcast may be determined based on the speed of each external terminal. Alternatively, the cycle in which the CAMs are broadcast may be controlled by an RSU.

In operation S420, the terminal may identify the locations of the plurality of external terminals, based on the CAMs. The locations of the plurality of external terminals may refer to locations relative to the terminal.

According to an embodiment of the disclosure, the terminal may identify the locations of the plurality of external terminals, based on location information included in the CAMs. For example, the location information may be obtained using a global Navigation Satellite System (GNSS). The terminal may obtain its own location information, and may identify relative locations of the plurality of external terminals with respect to the terminal, based on the location information of the plurality of external terminals and the obtained location information of the terminal.

In operation S430, the terminal may select at least one of the plurality of external terminals as a unicast target terminal, based on the identified locations. According to an embodiment of the disclosure, when the terminal faces a certain event, the terminal may select at least one external terminal associated with the certain event as a unicast target terminal, based on the identified locations.

According to an embodiment of the disclosure, the terminal may obtain matching information about the certain event and a location associated with the certain event. For example, the matching information may be stored in the terminal in the form of a profile, or may be received from an external source. Alternatively, the matching information may be trained by the terminal, or may be trained using a training apparatus located in the outside and transmitted to the terminal.

According to an embodiment of the disclosure, the terminal may select at least one location associated with the certain event, based on the matching information, and may select a unicast target terminal, based on the selected location and the identified locations.

Figure 5:
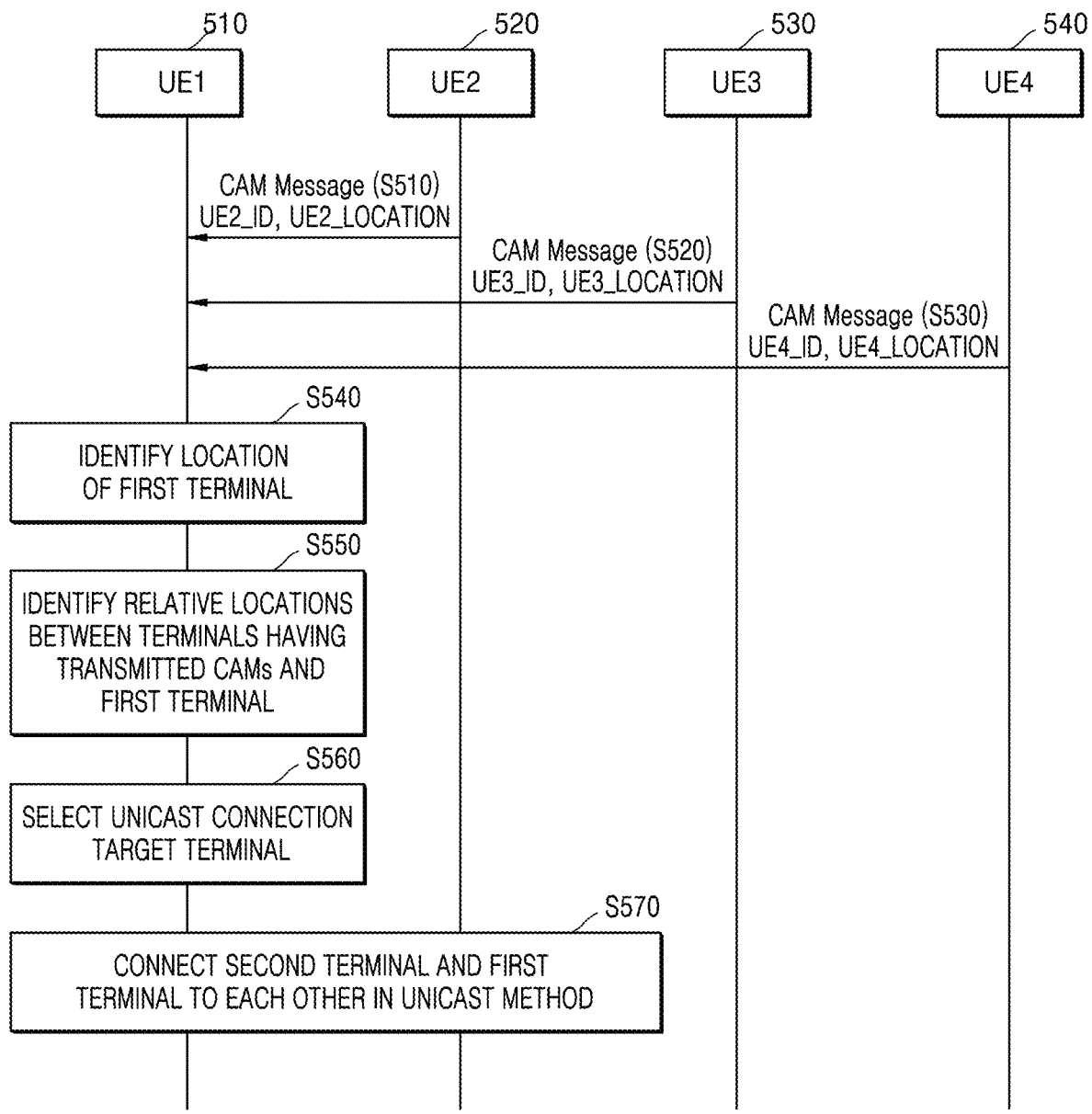
FIG. 5 illustrates a flowchart of a method of selecting a unicast target terminal, according to an embodiment of the disclosure.

FIG. 5 illustrates a flowchart of a method of selecting a unicast target terminal, according to an embodiment of the disclosure. In detail, FIG. 5 illustrates a diagram for describing an embodiment of the unicast target terminal selecting method of FIG. 4.

In operations S510 through S530, CAMs may be transmitted from second through fourth terminals 520 through 540 to a first terminal 510. The CAMs to be transmitted from the second through fourth terminals 520 through 540 to the first terminal 510 may include information about the respective IDs and respective locations of the second through fourth terminals 520 through 540.

According to an embodiment of the disclosure, time points when the first terminal 510 receives the CAMs from the second through fourth terminals 520 through 540, respectively, may not be the same as one another. The CAMs may be transmitted independently, and the first terminal 510 may receive the CAMs individually.

In operation S540, the location of the first terminal 510 may be identified. According to an embodiment of the disclosure, the location of the first terminal 510 may be obtained using a GNSS. Alternatively, the location of the first terminal 510 may be identified based on peripheral information obtained using various sensors.

In operation S550, relative locations between the terminals having transmitted the CAMs, namely, the second through fourth terminals 520 through 540, and the first terminal 510 may be identified. According to an embodiment of the disclosure, the first terminal 510 may identify the locations of the second through fourth terminals 520 through 540, based on location information included in the CAMs and the location of the first terminal 510 identified in operation S540. Time points when the first terminal 510 identifies the respective locations of the second through fourth terminals 520 through 540, respectively, may not be the same as one another. In other words, the first terminal 510 may individually identify the respective locations of the second through fourth terminals 520 through 540.

In operation S560, a unicast connection target terminal may be selected. According to an embodiment of the disclosure, when a certain event occurs, the first terminal 510 may select at least one external terminal associated with the certain event as the unicast target terminal, based on the identified locations. In FIG. 5, the second terminal 520 is selected as a unicast target terminal. However, this is merely an example, and the first terminal 510 may select a plurality of terminals as the unicast target terminal according to a certain event. Alternatively, according to a certain event, a plurality of terminals may be selected as groupcast target terminals.

In operation S570, the second terminal 520 selected as a unicast connection target and the first terminal 510 may be connected to each other in a unicast method. Because the first terminal 510 is aware of the ID of the selected second terminal 520, the first terminal 510 may form a certain connection with the second terminal 520.

Figure 6:
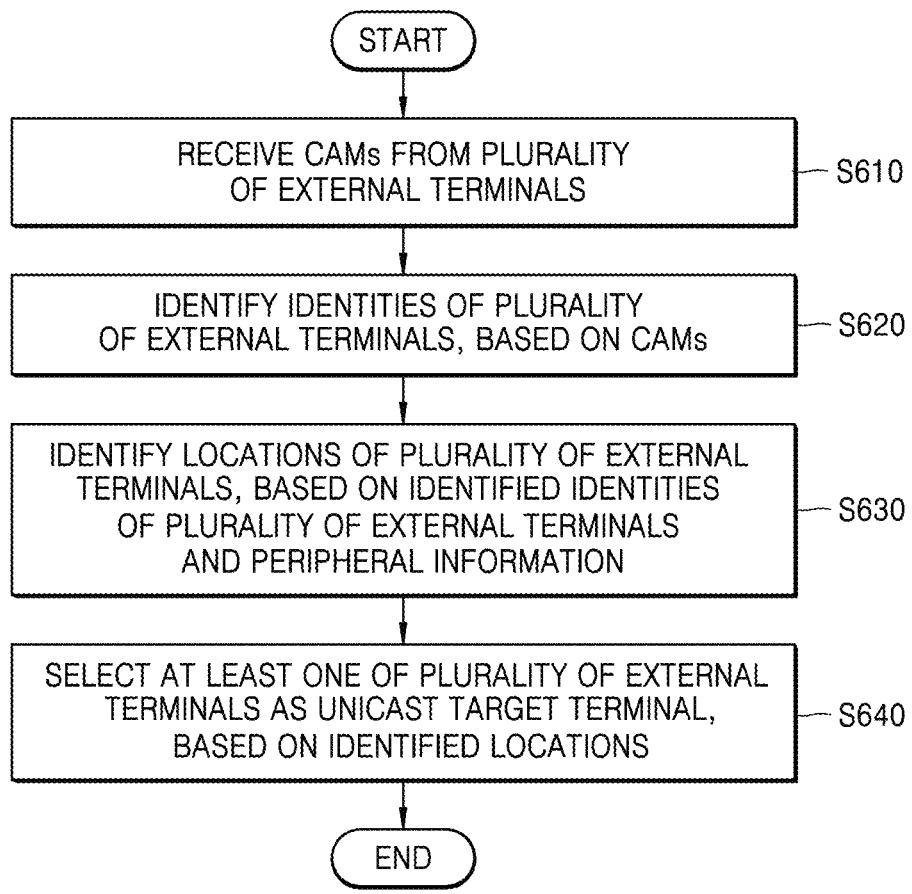
FIG. 6 illustrates a flowchart of a method of selecting a unicast target terminal, according to an embodiment of the disclosure.

FIG. 6 illustrates a flowchart of a method of selecting a unicast target terminal, according to an embodiment of the disclosure. Referring to FIG. 6, a terminal may select at least one of a plurality of external terminals as a unicast target terminal, based on vehicle identification information included in CAMs.

In operation S610, the terminal may receive the CAMs from the plurality of external terminals. The plurality of external terminals may transmit the CAMs in a broadcast method. According to an embodiment of the disclosure, each of the CAMs may include the ID of each of the plurality of external terminals and vehicle identification information. The vehicle identification information may be related to the plurality of external terminals. For example, the vehicle identification information may include a license plate number, vehicle driver identification information, a vehicle model, a vehicle color, a vehicle size, and information about accessories attached to a vehicle.

According to an embodiment of the disclosure, the CAMs may be periodically broadcast by the plurality of external terminals, respectively. A cycle in which the CAMs are broadcast may be determined based on the speed of each external terminal. Alternatively, the cycle in which the CAMs are broadcast may be controlled by an RSU.

In operation S620, the terminal may identify the identities of the plurality of external terminals, based on the CAMs. The identities of the plurality of external terminals may be identified based on the vehicle identification information included in the CAMs.

In operation S630, the terminal may identify the locations of the plurality of external terminals, based on the identified identities of the plurality of external terminals and peripheral information about the surroundings of the terminal. The peripheral information may be associated with the surrounding environment of the terminal, and may include information about vehicles around the terminal. According to an embodiment of the disclosure, the terminal may obtain peripheral information by using front/rear/left and right cameras, a recognition sensor, and the like of a vehicle.

The terminal may identify relative locations of the plurality of external terminals with respect to the terminal, based on the identified identities of the plurality of external terminals and the obtained peripheral information. For example, the terminal may extract information about the identities of terminals or vehicles around the terminal, namely, the vehicle identification information, from the obtained peripheral information, and may identify the relative locations of the plurality of external terminals with respect to the terminal by comparing the extracted information about the identities of the vehicles around the terminal and the identified identities of the plurality of external terminals. According to an embodiment of the disclosure, when no extracted vehicle identification information is identical with the vehicle identification information included in a CAM, the terminal may additionally obtain peripheral information about the surroundings within a farther radius and extract vehicle identification information again. According to another embodiment of the disclosure, when no extracted vehicle identification information is identical with the vehicle identification information included in a CAM, the terminal may determine that a terminal having transmitted the corresponding CAM is not a peripheral vehicle.

In operation S640, the terminal may select at least one of the plurality of external terminals as a unicast target terminal, based on the identified locations. According to an embodiment of the disclosure, when the terminal faces a certain event, the terminal may select at least one external terminal associated with the certain event as a unicast target terminal, based on the identified locations.

According to an embodiment of the disclosure, the terminal may obtain matching information about the certain event and a location associated with the certain event. For example, the matching information may be stored in the terminal in the form of a profile, or may be received from an external source. Alternatively, the matching information may be trained by the terminal, or may be trained using a training apparatus located in the outside and transmitted to the terminal.

According to an embodiment of the disclosure, the terminal may select at least one location associated with the certain event, based on the matching information, and may select a unicast target terminal, based on the selected location and the identified locations.

Figure 7:
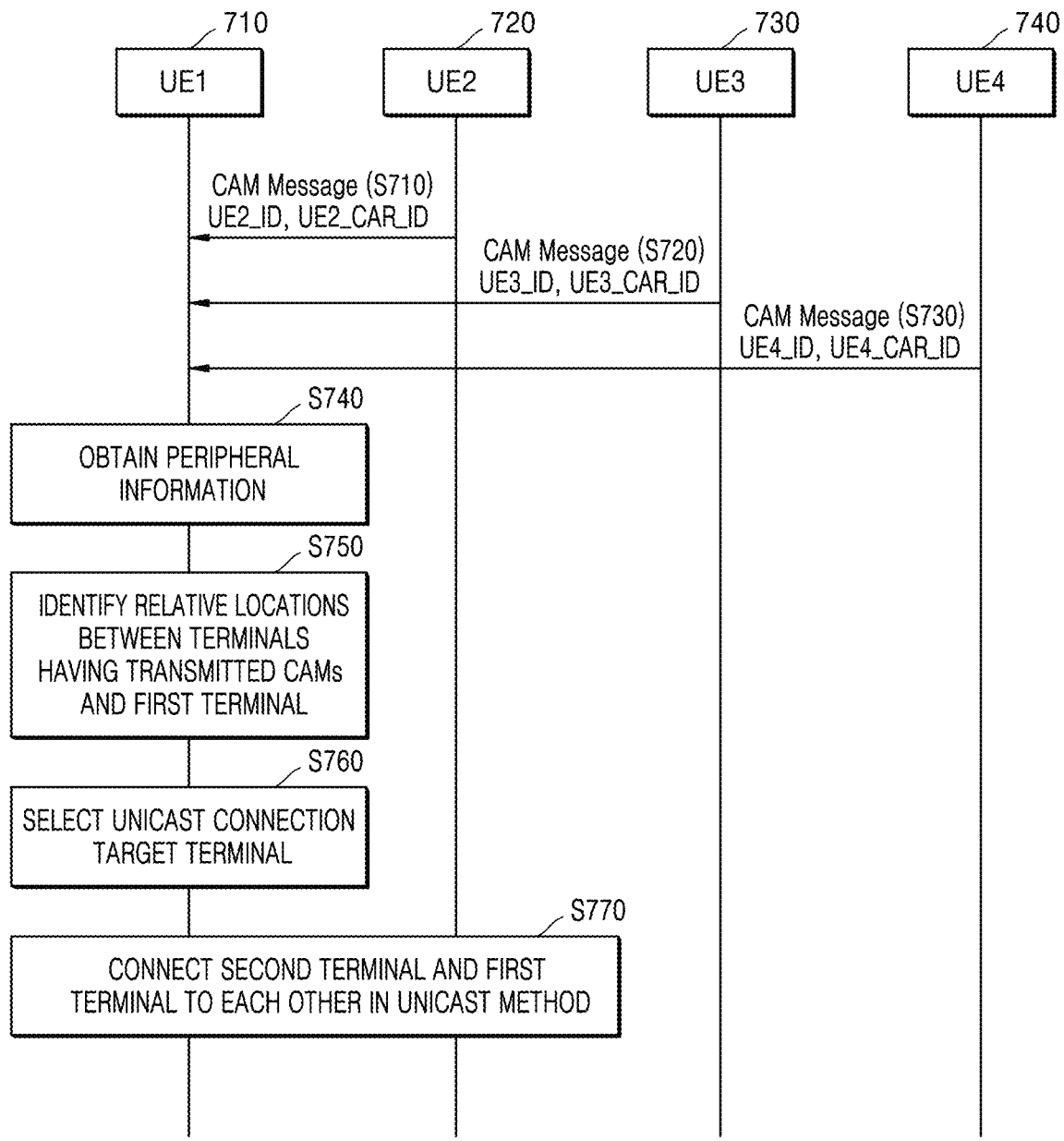
FIG. 7 illustrates a flowchart of a method of selecting a unicast target terminal, according to an embodiment of the disclosure.

FIG. 7 illustrates a flowchart of a method of selecting a unicast target terminal, according to an embodiment of the disclosure. In detail, FIG. 7 illustrates a diagram for describing an embodiment of the unicast target terminal selecting method of FIG. 6.

In operations S710 through S730, CAMs may be transmitted from second through fourth terminals 720 through 740 to a first terminal 710. The CAMs to be transmitted from the second through fourth terminals 720 through 740 to the first terminal 710 may include the respective IDs of the second through fourth terminals 720 through 740 and vehicle identification information.

According to an embodiment of the disclosure, time points when the first terminal 710 receives the CAMs from the second through fourth terminals 720 through 740, respectively, may not be the same as one another. The CAMs may be transmitted independently, and the first terminal 710 may receive the CAMs individually.

In operation S740, the first terminal 710 may obtain peripheral information. The peripheral information may be associated with the surrounding environment of the first terminal 710, and may include information about vehicles around the first terminal 710. According to an embodiment of the disclosure, the first terminal 710 may obtain peripheral information by using front/rear/left and right cameras, a recognition sensor, and the like of a vehicle.

In operation S750, relative locations between the terminals having transmitted the CAMs, namely, the second through fourth terminals 720 through 740, and the first terminal 710 may be identified. According to an embodiment of the disclosure, the first terminal 710 may identify the locations of the second through fourth terminals 720 through 740, based on the vehicle identification information included in the CAMs and the peripheral information obtained in operation S740. Time points when the first terminal 710 identifies the respective locations of the second through fourth terminals 720 through 740, respectively, may not be the same as one another. In other words, the first terminal 710 may individually identify the respective locations of the second through fourth terminals 720 through 740.

In operation S760, a unicast connection target terminal may be selected. According to an embodiment of the disclosure, when a certain event occurs, the first terminal 710 may select at least one external terminal associated with the certain event as the unicast target terminal, based on the identified locations. In FIG. 7, the second terminal 720 is selected as a unicast target terminal. However, this is merely an example, and the first terminal 710 may select a plurality of terminals as the unicast target terminal according to a certain event. Alternatively, according to a certain event, a plurality of terminals may be selected as groupcast target terminals.

In operation S770, the second terminal 720 selected as a unicast connection target and the first terminal 710 may be connected to each other in a unicast method. Because the first terminal 710 is aware of the ID of the selected second terminal 720, the first terminal 710 may form a certain connection with the second terminal 720.

Figure 8:
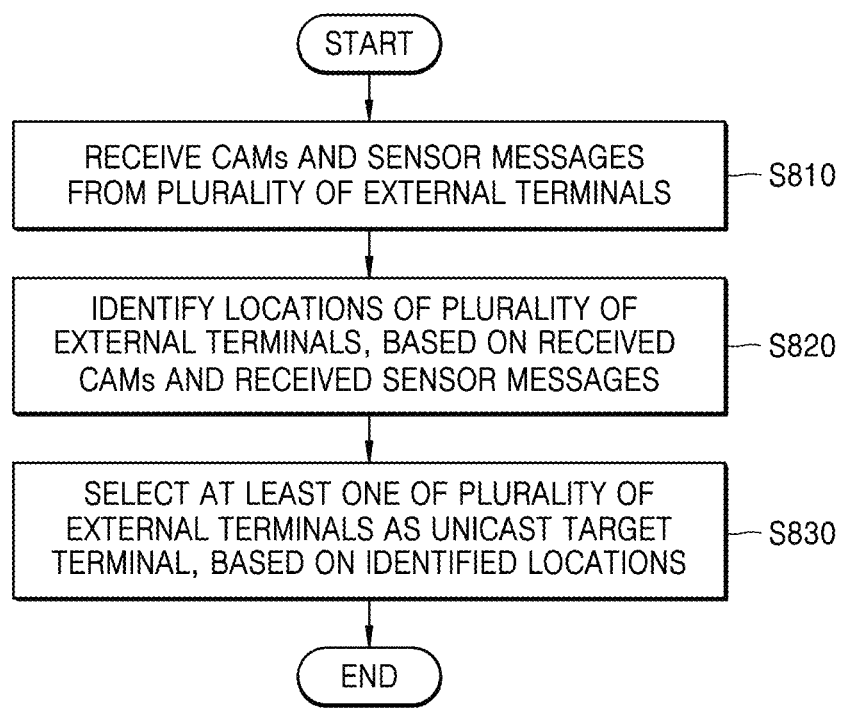
FIG. 8 illustrates a flowchart of a method of selecting a unicast target terminal, according to an embodiment of the disclosure.

FIG. 8 illustrates a flowchart of a method of selecting a unicast target terminal, according to an embodiment of the disclosure. Referring to FIG. 6, a terminal may select at least one external terminal from a plurality of external terminals, as a unicast target terminal, based on sensor messages.

In operation S810, the terminal may receive CAMs and the sensor messages from the plurality of external terminals. The plurality of external terminals may transmit the CAMs in a broadcast method. According to an embodiment of the disclosure, the CAMs may include the respective IDs of the plurality of external terminals. Each of the sensor messages may be transmitted by a directional transceiver. The directional transceiver may transmit information only in a pre-identified specific direction, and may transmit a sensor message in a broadcast method.

According to an embodiment of the disclosure, the CAMs may be periodically broadcast by the plurality of external terminals, respectively. A cycle in which the CAMs are broadcast may be determined based on the speed of each external terminal. Alternatively, the cycle in which the CAMs are broadcast may be controlled by an RSU.

In operation S820, the terminal may identify the locations of the plurality of external terminals, based on the CAMs and the sensor messages. According to an embodiment of the disclosure, the plurality of external terminals or vehicles on which terminals are located may periodically transmit sensor messages including their IDs. The terminal may identify the locations of the plurality of external terminals, based on the IDs included in the sensor messages and the directions of the sensor messages.

According to another embodiment of the disclosure, the plurality of external terminals or vehicles on which terminals are located may periodically transmit sensor messages including the IDs of sensors. At this time, the plurality of external terminals may include the IDs of the sensors in the CAMs and transmit the CAMs. The terminal may identify the locations of the plurality of external terminals, based on the sensor IDs included in the sensor messages, the directions of the sensor messages, and the CAMs.

In operation S830, the terminal may select at least one of the plurality of external terminals as a unicast target terminal, based on the identified locations. According to an embodiment of the disclosure, when the terminal faces a certain event, the terminal may select at least one external terminal associated with the certain event as a unicast target terminal, based on the identified locations.

According to an embodiment of the disclosure, the terminal may obtain matching information about the certain event and a location associated with the certain event. For example, the matching information may be stored in the terminal in the form of a profile, or may be received from an external source. Alternatively, the matching information may be trained by the terminal, or may be trained using a training apparatus located in the outside and transmitted to the terminal.

According to an embodiment of the disclosure, the terminal may select at least one location associated with the certain event, based on the matching information, and may select a unicast target terminal, based on the selected location and the identified locations.

FIG. 9 illustrates a flowchart of a method of selecting a unicast target terminal, according to an embodiment of the disclosure. In detail, FIG. 9 explains an embodiment of the unicast target terminal selecting method of FIG. 8.

In operations S910 through S930, CAMs may be transmitted from second through fourth terminals 920 through 940 to a first terminal 910. The CAMs to be transmitted from the second through fourth terminals 920 through 940 to the first terminal 910 may include information about the respective IDs of the second through fourth terminals 920 through 940, and may optionally include respective sensor IDs of the second through fourth terminals 920 through 940.

According to an embodiment of the disclosure, time points when the first terminal 910 receives the CAMs from the second through fourth terminals 920 through 940, respectively, may not be the same as one another. The CAMs may be transmitted independently, and the first terminal 910 may receive the CAMs individually.

In operation S940, a sensor message may be transmitted from the second terminal 920 to the first terminal 910. The sensor message may include the sensor ID of the second terminal 920. Because the sensor message is directionally transmitted, the sensor messages of the third and fourth terminals 930 and 940 having transmitted their CAMs to the first terminal 910 may not be received by the first terminal 910, according to location relationships. Although the first terminal 910 receives only the sensor message of the second terminal 920 in FIG. 9, this is merely an example.

In operation S950, a relative location between the terminal having transmitted the sensor message, namely, the second terminal 920, and the first terminal 910 may be identified. According to an embodiment of the disclosure, the first terminal 910 may identify the location of the second terminal 920, based on the ID included in the sensor message and the direction of the sensor message. According to another embodiment of the disclosure, the first terminal 910 may identify the location of the second terminal 920, based on the sensor ID included in the sensor message, the direction of the sensor message, and the sensor IDs included in the CAMs.

In operation S960, a unicast connection target terminal may be selected. According to an embodiment of the disclosure, when a certain event occurs, the first terminal 910 may select at least one external terminal associated with the certain event as the unicast target terminal, based on the identified location. In FIG. 9, the second terminal 920 is selected as a unicast target terminal. However, this is merely an example, and the first terminal 910 may select a plurality of terminals as the unicast target terminal according to a certain event. Alternatively, according to a certain event, a plurality of terminals may be selected as groupcast target terminals.

In operation S970, the second terminal 920 selected as a unicast connection target and the first terminal 910 may be connected to each other in a unicast method. Because the first terminal 910 is aware of the ID of the selected second terminal 920, the first terminal 910 may form a certain connection with the second terminal 920.

Figure 10A:
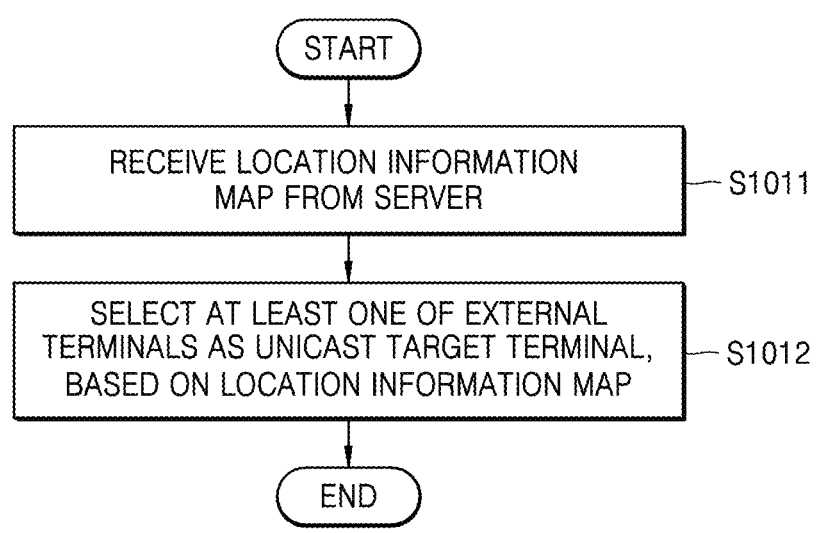
FIG. 10A illustrates a flowchart of a method of selecting a unicast target terminal, according to an embodiment of the disclosure.

FIG. 10A illustrates a flowchart of a method of selecting a unicast target terminal, according to an embodiment of the disclosure. Referring to FIG. 10A, a terminal may select, as a unicast target terminal, at least one external terminal from a plurality of external terminals, based on a location information map received from an RSU, for example, a sever.

In operation S1011, the terminal may receive the location information map from the server or the RSU. The location information map may include information about the locations of terminals located within a certain range.

In operation S1012, the terminal may select at least one of the plurality of external terminals as a unicast target terminal, based on the location information map. For example, the terminal may identify the locations of the plurality of external terminals by comparing the IDs of the plurality of external terminals included in the broadcast information with information about the IDs of terminals included in the location information map. The terminal may select at least one external terminal associated with a certain event as a unicast target terminal, based on the identified locations of the plurality of external terminals.

Figure 10B:
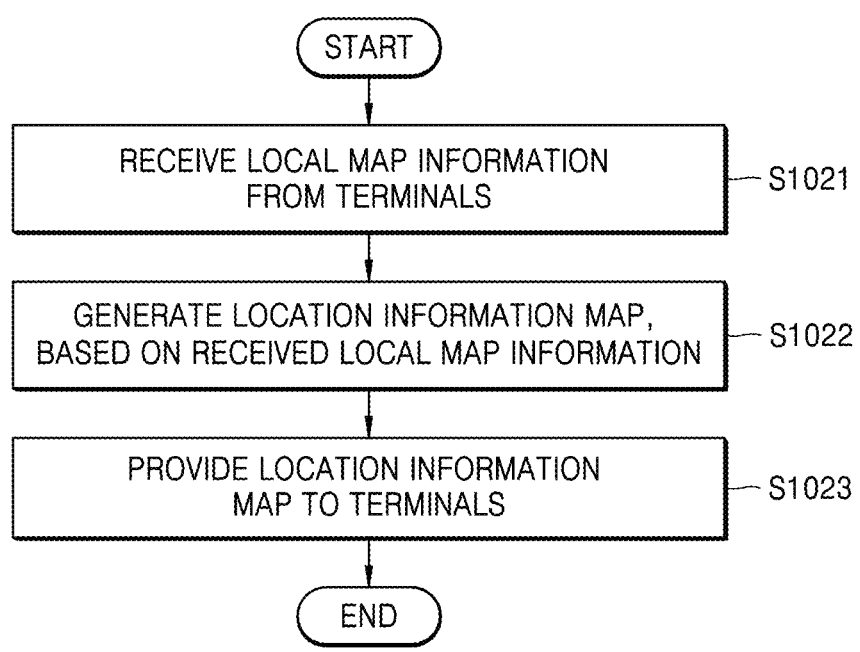
FIG. 10B illustrates a flowchart of a method of generating a location information map, according to an embodiment of the disclosure.

FIG. 10B illustrates a flowchart of a method of generating a location information map, according to an embodiment of the disclosure.

In operation S1021, a server or an RSU may receive local map information from terminals. The terminals may transmit the local map information to the RSU periodically or in response to a request from the RSU or a specific trigger. The local map information may be surrounding environment information obtained by each terminal, the surrounding environment information including the location information of each terminal.

In operation S1022, the server or RSU may generate the location information map, based on the received local map information. For example, the RSU may match the plurality of pieces of local map information, and may generate the location information map by correcting matched information.

In operation S1023, the server or RSU may provide the location information map to the terminals. According to an embodiment of the disclosure, the server or RSU may transmit the location information map to the terminals in response to requests from the terminals or a specific trigger.

FIG. 11 illustrates a flowchart of a method of selecting a unicast target terminal, according to an embodiment of the disclosure. In detail, FIG. 11 illustrates a diagram for describing the unicast target terminal selecting method described above with reference to FIGS. 10A and 10B.

In operations S1110 through S1140, pieces of local map information may be transmitted from first through fourth terminals 1110 through 1140 to an RSU 1150, respectively. The first through fourth terminals 1110 through 1140 may transmit the pieces of local map information to the RSU 1150 periodically or in response to a request from the RSU 1150 or a specific trigger. The local map information may be surrounding environment information obtained by each terminal, the surrounding environment information including the location information of each terminal.

In operations S1150 through S1170, CAMs may be transmitted from the second through fourth terminals 1120 through 1140 to the first terminal 1110. The CAMs to be transmitted from the second through fourth terminals 1120 through 1140 to the first terminal 1110 may include the respective IDs of the second through fourth terminals 1120 through 1140 and vehicle identification information.

According to an embodiment of the disclosure, time points when the first terminal 1110 receives the CAMs from the second through fourth terminals 1120 through 1140, respectively, may not be the same as one another. The CAMs may be transmitted independently, and the first terminal 1110 may receive the CAMs individually.

In operation S1180, the RSU 1150 may generate a location information map. According to an embodiment of the disclosure, the RSU 1150 may generate the location information map, based on the pieces of local map information received from the first through fourth terminals 1110 through 1140. For example, the RSU 1150 may match the plurality of pieces of local map information received from the first through fourth terminals 1110 through 1140, and may generate the location information map by correcting matched information.

In operation S1190, the RSU 1150 may provide the generated location information map to the first terminal 1110. According to an embodiment of the disclosure, the RSU 1150 may transmit the generated location information map to the first terminal 1110 in response to a request from the first terminal 1110 or a specific trigger.

In operation S1200, a unicast connection target terminal may be selected. According to an embodiment of the disclosure, the first terminal 1110 may identify the locations of the second through fourth terminals 1120 through 1140 having transmitted their CAMs, based on the location information map. When a certain event occurs, the first terminal 1110 may select at least one external terminal associated with the certain event as the unicast target terminal, based on the identified locations. In FIG. 11, the second terminal 1120 is selected as a unicast target terminal. However, this is merely an example, and the first terminal 1110 may select a plurality of terminals as the unicast target terminal according to a certain event. Alternatively, according to a certain event, a plurality of terminals may be selected as groupcast target terminals.

In operation S1210, the second terminal 1120 selected as a unicast connection target and the first terminal 1110 may be connected to each other in a unicast method. Because the first terminal 1110 is aware of the ID of the selected second terminal 1120, the first terminal 1110 may form a certain connection with the second terminal 1120.

Figure 12:
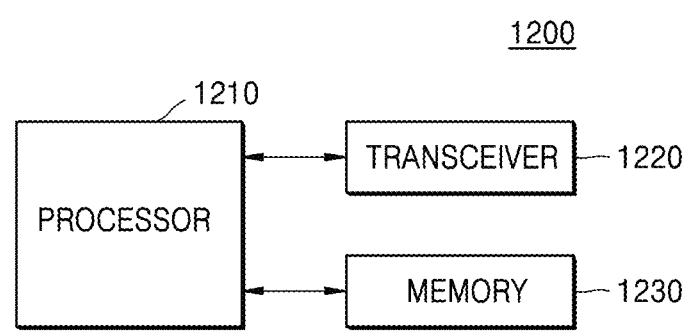
FIG. 12 illustrates a block diagram of a terminal according to an embodiment of the disclosure.

FIG. 12 illustrates a block diagram of a terminal 1200 according to an embodiment of the disclosure. Referring to FIG. 12, the terminal 1200 may include a processor 1210, a transceiver 1220, and a memory 1230. According to a communication service providing method of the terminal 1200, the transceiver 1220, the memory 1230, and the processor 1210 of the terminal 1200 may operate. However, components of the terminal 1200 are not limited thereto. For example, the terminal 1200 may include more or fewer components than those shown in FIG. 12. Furthermore, the transceiver 1220, the memory 1230, and the processor 1210 may be implemented as a single chip.

The processor 1210 may control a series of processes in which the terminal 1200 may operate according to the embodiments of the disclosure. For example, the processor 1210 may allow the terminal 1200 to receive or provide a broadcast service from or to at least one external terminal, and may allow the terminal 1200 to receive or provide a unicast or group/multicast service from or to the at least one external terminal. When the terminal 1200 faces a certain event, the processor 1210 may select at least one terminal associated with the certain event from among the at least one external terminal. The processor 1210 may form a unicast or groupcast connection with the selected at least one terminal.

The transceiver 1220 may transmit or receive a signal to or from a terminal or other entities. The signal may include control information and data. To this end, the transceiver 1220 may include an RF transmitter that up-converts and amplifies the frequency of a signal to be transmitted, and an RF receiver that low-noise-amplifies a received signal and down-converts the frequency of the received signal. However, this is only an embodiment of the transceiver 1220, and the components of the transceiver 1220 are not limited thereto.

The transceiver 1220 may receive a signal and output the signal to the processor 1210 through a wireless channel, and may transmit the signal output by the processor 1210 through a wireless channel.

The memory 1230 may store data and programs necessary for operations of the terminal 1200. Furthermore, the memory 1230 may store control information or data included in a signal obtained by the terminal 1200. The memory 1230 may be composed of storage media, such as read-only memory (ROM), random access memory (RAM), hard disks, compact disc (CD)-ROM, and digital versatile discs (DVDs), or a combination thereof. Furthermore, the memory 1230 may be composed of a plurality of memories.

Figure 13:
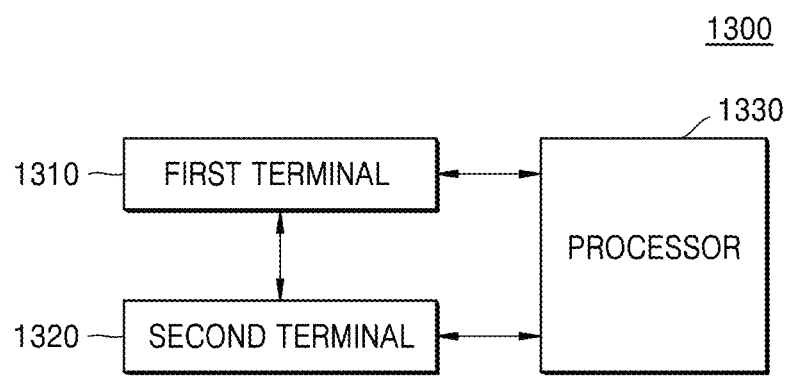
FIG. 13 illustrates a block diagram of a vehicle communication system according to an embodiment of the disclosure.

FIG. 13 illustrates a block diagram of a vehicle communication system 1300 according to an embodiment of the disclosure. Referring to FIG. 13, the vehicle communication system 1300 may include a first terminal 1310, a second terminal 1320, and an RSU 1330.

The vehicle communication system 1300 may include Vehicle-to-Vehicle (V2V) communication, Vehicle-to-Pedestrian (V2P) communication, and Vehicle-to-Infrastructure entity (V2I) communication. The V2V communication may refer to communication between vehicles. For example, when the first terminal 1310 and the second terminal 1320 are vehicles, the V2V communication may refer to communication between the first terminal 1310 and the second terminal 1320. For example, traffic information, running information, accident information, and the like may be shared between the first terminal 1310 and the second terminal 1320 via the V2V communication. The V2P communication may refer to communication between a vehicle and a user terminal. For example, when the first terminal 1310 is a vehicle and the second terminal 1320 is a user terminal, the V2P communication may refer to communication between the first terminal 1310 and the second terminal 1320. According to an embodiment, the user terminal may be of various types such as a mobile phone, a laptop computer, and a tablet. The V2I communication may refer to communication between a vehicle and an RSU. For example, when the first terminal 1310 and the second terminal 1320 are vehicles, the V2I communication may refer to communication between the first terminal 1310, the second terminal 1320, and the RSU 1330.

The first terminal 1310 may be connected to at least one external terminal including the second terminal 1320 and may receive or provide communication services. The first terminal 1310 may receive or provide a broadcast service from or to at least one external terminal, and may receive or provide a unicast- or group/multicast service from or to the at least one external terminal. At this time, the first terminal 1310 may receive broadcast information from each of the at least one external terminal. According to an embodiment of the disclosure, the broadcast information may include a CAM.

When the first terminal 1310 faces a certain event, the first terminal 1310 may transmit or receive communication services to or from at least one terminal associated with the certain event from among the at least one external terminal, using a unicast or groupcast method.

The first terminal 1310 may obtain the ID of each of the at least one external terminal from the broadcast information received from each of the at least one external terminal. The first terminal 1310 may select at least one terminal associated with the certain event from among the at least one external terminal, and may form a unicast or groupcast connection with the selected terminal, based on the obtained ID of the selected terminal.

According to an embodiment of the disclosure, the first terminal 1310 may identify the location of the at least one external terminal. The location of the at least one external terminal may refer to a relative location of the at least one external terminal with respect to the first terminal 1310.

According to an embodiment of the disclosure, the first terminal 1310 may identify the location of the at least one external terminal, based on the location information included in broadcast information received from the at least one external terminal. According to an embodiment of the disclosure, the first terminal 1310 may identify the location of the at least one external terminal, based on vehicle identification information included in the broadcast information received from the at least one external terminal. According to an embodiment of the disclosure, the first terminal 1310 may identify the location of the at least one external terminal, based on a sensor message received from the at least one external terminal. The sensor message may be transmitted by a directional transceiver. According to an embodiment of the disclosure, the first terminal 1310 may identify the location of the at least one external terminal, based on a location information map received from the RSU 1330.

According to an embodiment of the disclosure, it may be sufficiently understood by one of ordinary skill in the art that the first terminal 1310 may selectively combine the aforementioned embodiments of the disclosure, for example, combine some of the aforementioned embodiments of the disclosure in parallel or sequentially, to identify the location of the at least one external terminal and select at least one terminal associated with the certain event, based on the identified location.

The terminal described above may be implemented as a hardware component, a software component, and/or a combination of hardware components and software components. For example, the apparatuses and components described in the examples may be implemented using at least one general-use computer or special-purpose computer, such as, a processor, a controller, an arithmetic logic unit (ALU), a digital signal processor, a microcomputer, a field programmable array (FPA), a programmable logic unit (PLU), a microprocessor, or any other device capable of executing and responding to instructions.

While the disclosure has been particularly shown and described with reference to examples thereof, it will be understood by those of ordinary skill in the art that various changes in form and details may be made therein without departing from the spirit and scope of the disclosure as defined by the following claims. For example, an appropriate result may be attained even when the above-described techniques are performed in a different order from the above-described method, and/or components, such as the above-described system, structure, device, and circuit, are coupled or combined in a different form from the above-described methods or substituted for or replaced by other components or equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a terminal for providing vehicle communication services, the method comprising:
    obtaining broadcast information broadcast by a plurality of external terminals;
    identifying, based on the broadcast information, information including at least one of peripheral information obtained by a sensor of the terminal or a sensor message received from at least one external terminal of the plurality of external terminals, wherein the sensor message is transmitted via at least one directional transceiver of the at least one external terminal;
    determining relative locations of the plurality of external terminals associated with the terminal, based on the obtained broadcast information and the identified information; and
    determining at least one terminal of the plurality of external terminals as a unicast target terminal, based on the determined relative locations.

2. The method of claim 1, wherein the obtained broadcast information comprises a cooperative awareness message (CAM), and wherein the identified information further includes at least one of location information of the plurality of external terminals included in the broadcast information or vehicle identification information of the plurality of external terminals included in the broadcast information.

3. The method of claim 1,
   wherein the broadcast information comprises location information of the plurality of external terminals;
   wherein identifying the information comprises obtaining location information of the terminal; and
   wherein determining the relative locations of the plurality of external terminals associated with the terminal comprises determining the relative locations of the plurality of external terminals with respect to the terminal, based on the location information of the plurality of external terminals and the obtained location information of the terminal.

4. The method of claim 3, wherein the location information of the terminal is obtained using a global navigation satellite system (GNSS).

5. The method of claim 1,
   wherein the broadcast information comprises vehicle identification information of the plurality of external terminals;
   wherein the identified information comprises the peripheral information; and
   wherein determining the relative locations of the plurality of external terminals associated with the terminal comprises determining the relative locations of the plurality of external terminals with respect to the terminal, based on the vehicle identification information of the plurality of external terminals and the obtained peripheral information.

6. The method of claim 5, wherein the vehicle identification information comprises at least one of a license plate number, driver identification information, a vehicle model, or a vehicle color.

7. The method of claim 5, wherein identifying the information comprises:
   extracting vehicle identification information of at least one terminal located in a vicinity of the terminal, based on the peripheral information;
   comparing the extracted vehicle identification information with the vehicle identification information of the plurality of external terminals included in the obtained broadcast information; and
   determining the relative locations of the plurality of external terminals associated with the terminal, based on a result of the comparison.

8. The method of claim 1, further comprising
   identifying sensor information of the at least one external terminal from the sensor messages, and
   determining the relative locations of the plurality of external terminals associated with the terminal based on the obtained broadcast information and the sensor information of at least on external terminal.

9. The method of claim 1, further comprising receiving a location information map from a roadside unit (RSU),
   wherein determining the relative locations of the plurality of external terminals associated with the terminal comprises determining the relative locations of the plurality of external terminals associated with the terminal, based on the obtained broadcast information and the received location information map.

10. The method of claim 1, further comprising:
    recognizing an event associated with the terminal; and
    identifying a second location associated with the recognized event associated with the terminal,
    wherein determining the at least one external terminal of the plurality of external terminals as the unicast target terminal comprises determining the at least one external terminal of the plurality of external terminals as the unicast target terminal, based on the identified second location.

11. A terminal for providing vehicle communication services, the terminal comprising:
    a transceiver; and
    a processor operably connected to the transceiver, the processor configured to:
        obtain broadcast information broadcast by a plurality of external terminals,
        identify, based on the broadcast information, information including at least one of peripheral information obtained by a sensor of the terminal or a sensor message received from at least one external terminal of the plurality of external terminals, wherein the sensor message is transmitted via at least one directional transceiver of the at least one external terminal,
        determine relative locations of the plurality of external terminals associated with the terminal, based on the obtained broadcast information and the identified information, and
        determine at least one terminal of the plurality of external terminals as a unicast target terminal, based on the determined relative locations.

12. The terminal of claim 11, wherein the obtained broadcast information comprises a cooperative awareness message (CAM), and wherein the identified information further includes at least one of location information of the plurality of external terminals included in the broadcast information or vehicle identification information of the plurality of external terminals included in the broadcast information.

13. The terminal of claim 11, wherein the broadcast information comprises location information of the plurality of external terminals, and the processor is further configured to:
    obtain location information of the terminal; and
    determine the relative locations of the plurality of external terminals associated with the terminal, based on the location information of the plurality of external terminals and the obtained location information of the terminal.

14. The terminal of claim 13, wherein the location information of the terminal is obtained using a global navigation satellite system (GNSS).

15. The terminal of claim 11, wherein:
    the obtained broadcast information comprises vehicle identification information of the plurality of external terminals; and
    the processor is configured to:
        obtain the peripheral information of the terminal, and
        determine the relative locations of the plurality of external terminals associated with the terminal, based on the vehicle identification information of the plurality of external terminals and the obtained peripheral information of the terminal.

16. The terminal of claim 15, wherein the vehicle identification information comprises at least one of a license plate number, driver identification information, a vehicle model, or a vehicle color.

17. The terminal of claim 15, wherein the processor is further configured to:

extract vehicle identification information of at least one terminal located in a vicinity of the terminal, based on the obtained peripheral information,
compare the extracted vehicle identification information with the vehicle identification information of the plurality of external terminals included in the obtained broadcast information, and
determine the relative locations of the plurality of external terminals associated with the terminal, based on a result of the comparison.

18. The terminal of claim 11, wherein the processor is further configured to:
identify sensor information of the at least one external terminal from the sensor messages, and
determine the relative locations of the plurality of external terminals associated with the terminal, based on the obtained broadcast information and the sensor information of the at least one external terminal.

19. The terminal of claim 11, wherein the processor is further configured to:
receive a location information map from a roadside unit (RSU); and
identify the locations of the plurality of external terminals associated with the terminal, based on the obtained broadcast information and the received location information map.

20. The terminal of claim 11, wherein the processor is further configured to:
recognize an event associated with the terminal;
identify a second location associated with the recognized event associated with the terminal; and
determine the at least one of the plurality of external terminals as the unicast target terminal, based on the identified second location.

* * * * *